(12) United States Patent
Fairclough et al.

(10) Patent No.: US 8,227,041 B2
(45) Date of Patent: Jul. 24, 2012

(54) SELF-ASSEMBLING BLOCK COPOLYMER FILM

(75) Inventors: John Patrick Anthony Fairclough, Sheffield (GB); Christine Fernyhough, Sheffield (GB); Nadejda Todorova Tzokova, Sheffield (GB)

(73) Assignee: University of Sheffield, Firth Courth, Western Bank, Sheffield (GB)

( * ) Notice: Subject to any disclaimer, the term of this patent is extended or adjusted under 35 U.S.C. 154(b) by 956 days.

(21) Appl. No.: 11/910,380

(22) PCT Filed: Mar. 30, 2006

(86) PCT No.: PCT/GB2006/001198
§ 371 (c)(1),
(2), (4) Date: Jun. 23, 2008

(87) PCT Pub. No.: WO2006/103462
PCT Pub. Date: Oct. 5, 2006

(65) Prior Publication Data
US 2009/0041995 A1  Feb. 12, 2009

(30) Foreign Application Priority Data
Mar. 30, 2005  (GB) .................................. 0506362.3

(51) Int. Cl.
*B05D 5/06* (2006.01)
(52) U.S. Cl. ...................................... 427/384; 427/385.5
(58) Field of Classification Search .......................... None
See application file for complete search history.

(56) References Cited

U.S. PATENT DOCUMENTS

| | | | |
|---|---|---|---|
| 2,590,906 A | 4/1952 | Tripp | |
| 3,711,176 A | 1/1973 | Alfrey et al. | |
| 5,009,486 A | 4/1991 | Dobrowolski et al. | |
| 5,103,337 A | 4/1992 | Schrenk et al. | |
| 6,264,747 B1 | 7/2001 | Shaw et al. | |
| 6,720,061 B1 * | 4/2004 | Port et al. ...................... | 428/156 |
| 6,797,366 B2 | 9/2004 | Hanson et al. | |
| 2003/0035972 A1 | 2/2003 | Hanson et al. | |
| 2004/0115817 A1 | 6/2004 | Liu et al. | |

FOREIGN PATENT DOCUMENTS

| | | |
|---|---|---|
| GB | 2424647 | 10/2006 |
| WO | WO 95/17303 | 6/1995 |
| WO | WO 96/19347 | 6/1996 |
| WO | WO 00/37541 | 6/2000 |
| WO | WO 00/58760 | 10/2000 |
| WO | WO 2006/103462 | 5/2006 |

OTHER PUBLICATIONS

Hadjichristidis, N. et al.; *J. Polym. Sci:Part A.:Polymer Chem.*, 2000; vol. 38. pp. 3211-3234.
Chung, T.C. et al.; *Macromolecules*; 1988; vol. 21. pp. 1903-1907.
Mao G. et al.; *Macromolecules*; 1997; vol. 30. pp. 2556-2567.
UK Examaination Report dated Oct. 31, 2008.

* cited by examiner

*Primary Examiner* — Erma Cameron
(74) *Attorney, Agent, or Firm* — King & Spalding LLP

(57) ABSTRACT

A multilayer light reflective, variable interlayer separation (d-spacing), cross-linked self-assembling block copolymer film or coating wherein a property of the reflected light can be changed by varying the interlayer separation (d-spacing) of the film or coating.

9 Claims, 2 Drawing Sheets

SELF-ASSEMBLING BLOCK COPOLYMER FILM

The application is a national phase entry under U.S. §371 (e) of International Application No. PCT/GB2006/001198, filed Mar. 30, 2006, published as International Publication No. WO 2006/103462, which claims priority to Great Britain Patent Application No. 0506362.3, filed Mar. 30, 2005.

This invention relates to self-assembling block copolymer films, and more particularly to novel cross-linked self-assembling block copolymer films, film-forming compositions comprising cross-linkable self-assembling block copolymers and blends thereof, methods for manufacturing such films and compositions, and their uses, for example, in currency and document protection and in analytical methods.

Interference filters have been known for many years (see, for example, U.S. Pat. No. 2,590,906). A typical interference filter has a largely reflective metal film on a smooth substrate. The reflective film is overlain by a thin layer of transparent dielectric material, more often a dielectric stack. This stack comprises alternating layers of dielectric material, with differing refractive indices. The filter is completed by a semi-reflective metal layer over the dielectric material. A transparent protective coating may be applied over the reflective coating, but does not form part of the interference filter itself.

When an incident light beam encounters the front semi-reflective coating of the interference filter, one fraction of the light is reflected and the other fraction passes through the semi-reflective layer into the dielectric material. The transmitted portion of the beam is then again partially reflected by the next reflective layer and retransmitted through the dielectric layer. This continues through the stack. The reflected waves pass through the semi-reflective front layer where they may constructively or destructively interfere with the reflected light, resulting in the generation of colour.

The interlayer separation or "d-spacing" (see FIG. 1) of the dielectric material is a whole multiple of quarter wavelengths of light for constructive interference (allowing for the index of refraction of the dielectric material). Thus, when light is reflected from the interference filter, light with the appropriate wavelength has the reflected and transmitted beams in phase for constructive interference. Light of other colours has at least partial destructive interference. Thus, when a reflective interference filter is observed in white light, it reflects a strong characteristic colour.

FIG. 1 shows the interlayer separation or "domain (d)-spacing" of a lamella structure dielectric material. Here only four layers are shown although in practice many more layers would usually be present.

Interest has developed in recent years in the protection of currency and other documents from counterfeiting by use of interference filters. The colour variations available from interference filters cannot be duplicated by copying machines and the specialized equipment needed for producing the interference filters is not readily available to counterfeiters. Thus, it has been proposed to mark currency with multicoloured interference filter patterns to inhibit counterfeiting (see, for example, U.S. Pat. No. 5,009,486).

The interference filter has a desirable characteristic as an anti-counterfeiting measure. The colour reflected from the filter depends on the path length of light passing through the dielectric material. When the filter is observed with light at normal incidence, a certain colour, for example red, is seen. When the interference filter is observed at an angle nearer grazing incidence, a shorter wavelength colour, for example, blue, is observed. Such a characteristic change of colour, depending on the angle of viewing the interference filter, cannot be reproduced by copying machines.

To make it even more difficult for counterfeiters, it has been proposed to use interference filter layers having different interlayer separation in different areas. Since the colour of light reflected from an interference filter is a function of the interlayer separation of the dielectric material, one can thereby achieve a multi-colour effect by having different areas of the filter with different interlayer separations or by patterning the surface with a relief pattern.

The original interference filters used inorganic optical coating materials, such as those listed in U.S. Pat. No. 5,009,486. A layer of such material is deposited with a certain thickness. A mask is superimposed and a second layer of that material is deposited over a portion of the first layer. Collectively, these two layers define areas of differing thicknesses and hence, different interference colours.

Such a technique is costly. The metal and dielectric layers are typically deposited on a thin film polyester substrate by a sputtering technique at a rate of about 3 to 10 meters per minute movement of the film past the deposition stations. Much faster deposition is desirable. Furthermore, two separate deposition steps with intervening masking of the surface must be performed to provide the two layers of dielectric which collectively provide a colour difference.

In U.S. Pat. No. 6,264,747 there is described a multi-colour interference polymer material coating for a transparent or opaque substrate. The coating material is an acrylate polymer and different colours are obtained by having different thicknesses of transparent coating in adjacent areas. The coating is deposited by evaporation of acrylate monomer, which requires specialized equipment, and the process of depositing different thicknesses in different areas is difficult to control.

The use of multilayer reflection films comprising alternating layers of two or more polymers to reflect light is known and is described, for example, in U.S. Pat. No. 3,711,176, U.S. Pat. No. 5,103,337, WO 96/19347 and WO 95/17303. U.S. Pat. No. 6,797,366 describes a multilayer polymeric film characterized by a change in colour as a function of viewing angle.

According to the present invention there is provided an improved polymer film or coating having variable light reflective properties, and compositions and methods for making such films or coatings, and their uses.

In a first aspect, the present invention provides a multilayer, light reflective, variable interlayer separation, cross-linked self-assembling block copolymer film or coating wherein a property of the reflected light can be changed by varying the interlayer separation of the film or coating.

In a second aspect, the invention provides a method of changing an optical property of a multilayer light reflective, cross-linked self-assembling block copolymer film, which comprises treating the film to vary the interlayer separation thereof whereby an optical property of the reflected light is changed.

In a third aspect, the invention provides a method of manufacturing a multilayer, light reflective, variable interlayer separation, cross-linked self-assembling block polymer film, which comprises depositing a film of a self-assembling block copolymer or a blend of self-assembling block copolymers on a substrate, and cross-linking the deposited film.

In a fourth aspect, the invention provides a film-forming or coating composition comprising a solution of a cross-linkable self-assembling block copolymer or a blend of self-assembling block copolymers in a volatile solvent.

In a fifth aspect the invention provides a method for changing a property of a substrate in response to incident light impinging thereon, which comprises depositing on the substrate a multilayer, light reflective, self-assembling block polymer film or coating, cross-linking the polymer and treating the film or coating to vary the interlayer separation thereof, thereby changing a property of light reflected from the film or coating.

In a sixth aspect, the invention provides a device for detecting the amount or presence of a substance, the device comprising a substrate having deposited thereon a multilayer cross-linked self-assembling block copolymer film or coating that has an optically active surface exhibiting a first colour in response to incident light impinging thereon when the substance is absent and exhibiting a second colour in response to the same light when the substance is present on or in the surface.

In yet further embodiments, the invention provides an interference film which may be formed from a self-assembling block copolymer or a blend of self-assembling block copolymers. This film acts to cause incident light to undergo interference such that a specific colour is produced on the surface of the film. When the interlayer separation of the film changes a colour change or wavelength intensity change is observed.

Figure 1:
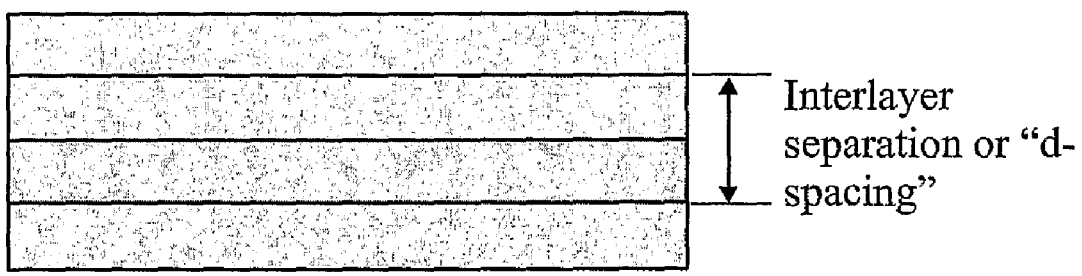
FIG. 1 illustrates the interlayer separation or "d-spacing" of a dielectric material.

In this specification, a film or coating is considered to be "light reflective" if at least a portion of the incident light is reflected, such that the film or coating appears opaque, translucent or coloured, either before or after treatment to vary the interlayer separation of the film or coating, or both.

In this specification, the "interlayer separation" of a multilayer film or coating is defined as the thickness of the optical repeating unit comprising alternating layers (lamellae) of different refractive indices. Usually the optical repeating unit will comprise two layers of different refractive indices, although three or more layers are also possible.

In this specification, a film or coating is considered to be "variable interlayer separation" if its interlayer separation varies in response to different physical or chemical environments.

In the present specification, a "block copolymer" is defined as a copolymer in which two or more dissimilar polymer chains are joined together by a covalent bond. Dissimilar polymer chains are defined herein as being those that have relatively little or no interaction (for example, hydrogen bonding, or Van der Waals forces) between them such that, in the absence of the covalent bond, they would tend to phase separate. The presence of the covalent bond prevents complete phase separation and the polymer chains can automatically self-assemble into lamellae parallel to the substrate. The formation of lamellae and the domain size are determined by the molecular weight (Mn) of the block copolymer; the volume fraction of each dissimilar polymer, and, its temperature, and are influenced by the presence of any solvent for the copolymer and the amount of solvent.

In this specification the term "multilayer" is intended to mean a plurality of optical repeating units of two or more lamellae. Thus a multilayer film will have at least four lamellae, preferably at least 50 lamellae, more preferably at least 100 lamellae.

In general the property of the reflected light that can most usefully be changed is colour, and the invention will hitherto be more particularly described with reference thereto. However it is to be understood that the invention is not limited to the property of colour, and other properties such as polarity are not excluded. Before treatment to vary its interlayer separation, the film or coating can have a first colour, defined as a spectral distribution of the emanating light, or it can be translucent or transparent. After treatment, the film or coating can exhibit a second colour which is different from the first colour (by having a combination of wavelengths of light which differ from that combination present in the first colour, or having a different spectral distribution, or by having an intensity of one or more of those wavelengths different from those present in the first colour). The second colour is exhibited in response to the same incident light. The change from transparent to coloured or from one colour to another can be measured either by use of an instrument, or by eye.

An "optically active surface" is a surface that participates in the generation of an optical effect such that the incident light impinging upon that surface is in some way altered. Such optically active surfaces may be adapted to respond not only to polychromatic light (e.g., white light) but also to monochromatic light (e.g., laser light, which may be inherently polarized).

Devices of this invention preferably produce a colour signal that strongly contrasts the background interference colour of the untreated test surface and a treated surface. The test surface may produce various shades or intensities of colour that correspond to a semi-quantitative measurement of the substance concentration in the sample, and may be visually or instrumentally measured. Such devices allow the quantitative, instrumented analysis of thin film assay systems.

In one embodiment, the optically active surface has a non-specular surface, or is provided with a transparent layer having a non-specular surface through which the optically active surface may be viewed. This embodiment is useful in the invention since it makes the angle from which the surface is viewed less important. The term "non-specular" is meant to indicate that the surface does not act mirror-like (specular), but provides a diffuse response to light. Generally, it includes an irregular surface with between 100 nm and 1.00 μm variations in height. The primary advantage is that a diffuse reflection allows the colour change to be visible over a broad range of angles relative to the incident light.

The polymer blocks comprising the self assembling block copolymer or self-assembling block copolymer blend can be derived from any suitable polymers having limited or minimal interaction between them, as previously described. Di-block and tri-block copolymers are included in the invention together with suitable higher block copolymers and blends thereof. Suitable polymers include block copolymers of polyolefins or polydienes, for example, block copolymers of $C_{1-6}$ aliphatic monomers, for example ethylene, propylene, n-butene, isobutene, n-pentene, and n-hexene; polydienes, for example, isoprene, and butadiene; $C_{8-12}$ aromatic monomers, for example, styrene; and similar olefin polymers. Block copolymers of polyolefins with other olefin polymers can also be used, for example, block copolymers of polyolefins with vinyl polymers derived from $C_{1-6}$ aliphatic esters, alcohols, and amines, $C_{1-6}$ alkylene oxides, and $C_{7-12}$ heterocyclic monomers. Copolymers of olefin monomers can also be used, and also copolymers of olefin monomers with other unsaturated monomers, for example, $C_{1-6}$ aliphatic esters, alcohols, and amines, $C_{1-6}$ alkylene oxides, and $C_{7-12}$ heterocyclic monomers. Preferred block copolymers include, for example, block copolymers of styrene with methylmethacrylate P(S- b-MMA), isoprene P(S-b-I), butadiene P(S-b-BD), ethylene oxide P(S-b-PEO) and 2-vinylpyridine P(S-b-2-VP). The block copolymers can be made, for example, by anionic polymerisation, for example, as described by Hadjichristidis[1].

In this specification, a self assembling block copolymer is intended to mean a block copolymer that can self assemble from a disordered or ordered system (for example from a solution) into ordered lamellae. The block copolymer film or coating of the invention comprises self assembled lamellae or multi-layers of the polymers comprising the block copolymer or blend of block copolymers. Not all block copolymers self assemble into lamellae, but it is within the knowledge of the skilled worker in the field to select the appropriate polymer components that will self assemble into lamellae when formed into a film or coating.

An important factor in determining whether a block copolymer will self assemble into lamellae is the relative volume fraction of one of the blocks, the relative incompatibility of the monomer units, measured by the Flory-Huggins interaction parameter (Greek Symbol Chi $\chi$), and the degree of polymerisation of the block copolymer. Preferably the volume fraction of one of the blocks is 40-60, more preferably 50-50 and the degree of polymerisation (N) and Flory-Huggins interaction parameter of the block copolymer is preferably greater than 10.5 and is more preferably greater than 25. In addition to this, the product of spacing between the microphase separated layers and the refractive index of each layer is important, as demonstrated by the equation $\lambda R = 2[n_1 d_1 + n_2 d_2]$ (see below).

The colour of the block copolymer film or coating is also dependent on the molecular weight Mn, and it has been found that block copolymers of molecular weight less than 500,000 are transparent and may not always exhibit the desired colour change.

The nature and extent of the colour change is also dependent upon the refractive indices of the lamellae. The wavelength of the reflected light, at normal incidence, is related to the refractive indices of the lamellae by the equation:

$$\lambda R = 2[n_1 d_1 + n_2 d_2]$$

wherein $\lambda R$ is the wavelength of the reflected light, $n_1$ and $n_2$ are the refractive indices of the lamellae, and $d_1$ and $d_2$ are the thickness of the lamellae.

Preferably the components of the block copolymer or block copolymer blend are chosen such that the refractive indices of the lamellae differ by at least 0.06 and more preferably by at least 0.08. In certain preferred embodiments of the invention the refractive indices of the lamellae are modified to increase the difference between them whereby an optical property of the reflective light is changed. Such modifications can be accomplished, for example, by varying the film composition using copolymer blends or by the addition of refractive index modifiers. Where a refractive index modifier is used it can be either coloured or colourless and can be added to one or more of the lamellae such that the difference between the refractive indices of the lamellae of the interlayers is increased relative to the refractive indices of the unmodified copolymer lamellae.

For example, the refractive index difference can be increased by the addition of higher refractive index particles to one polymer component of the block copolymer. Such higher refractive index particles including, for example, nanoparticles of certain noble metals such as gold, silver, platinum and copper, and more especially gold. Other nanoparticles that may be useful include metal oxides, for example, cerium and zinc oxide nanoparticles.

The block copolymer or blend thereof can be cross-linked by any convenient method. In one embodiment the block copolymer or blend thereof is deposited as a film or coating and then cross-linked using UV light or ionising radiation. If necessary, free radical initiators or prorads may be added to the block copolymer or blend thereof in order to assist the cross-linking reaction. Preferably, however, the block copolymer or blend thereof comprises a cross-linking agent, especially when the block copolymer or blend thereof is used in a film-forming or coating composition. Preferably the cross-linking agent and concentration of cross-linking agent are chosen such that the rate constant of the cross-linking reaction is relatively slow, thereby giving a relatively long pot life for the film-forming or coating composition. This is particularly important when the film-forming composition or coating composition is to be used as a printing ink or deposited using ink jet printing technology. Preferably the rate constant of the cross-linking reaction is such that the speed of cross-linking is slower than the speed of self assembly of the block copolymer or blend thereof.

The choice of cross-linking agent will depend on the nature of the components of the block copolymer or blend thereof. If necessary, the block copolymer or copolymers can be functionalised in order to introduce functional groups, for example, hydroxyl groups, or carboxyl groups. A particularly preferred method of introducing functional groups into a polymer is described in Chung[2]. Suitable cross-linking agents include, for example, isocyanates for example, methylene diisocyanate (MDI), toluene diisocyanate (TDI), hexamethylene diisocyanate (HDI), 4,4'-methylenebis(cyclohexyl isocyanate) (HMDI), 5-isocyanato-1-(isocyanatomethyl)-1,3,3-trimethylcyclohexane (IPDI), or 1,3-bis-isocyanato-1-methylene ethylene benzene (TMXDI); carbodiimides; peroxides, for example, benzoyl peroxide; polyols, for example, trimethylolpropane (TMP)-based triols and pentaerythritol-based tetrols; primary and secondary di- and polyamines, for example, aliphatic amines containing ethoxy and propoxy groups and polyoxypropylenediamines; aromatic diamines, for example, DETDA—diethyl toluene diamine, dichloro-4,4'-methylenedianiline (MOCA), 4,4'diaminodiphenylmethane, diaminobenzene, dimethoxydiaminobiphenyl, dimethyldiaminobiphenyl, diaminobiphenyl and dichlorodiaminobiphenyl; methylpolyethyleneglycolamines; mercaptopropionic acid and mercaptopropionates; and silanes, for example, secondary-butylaminosilanes. Modifiers and catalysts may be added to control the rate of crosslinking as appropriate. Particularly suitable cross-linking agents include, methylene diisocyanate (MDI) and toluene diisocyanate (TDI).

The degree of cross-linking of the block copolymer or blend thereof is preferably relatively low, and normally less than 20%. Preferably the degree of cross-linking of the block copolymer is from 1 to 15%, more preferably from 5 to 10%, and most preferably about 7%.

The block copolymer film or coating is preferably formed by depositing the film or coating onto a substrate. Any suitable substrate may be used, but polymeric substrates such as, for example, cellulose films and polypropylene films are preferred. The block copolymer film or coating can, however, also be deposited on glass, ceramics, cellulose fibres and paper, and metallic substrates. When using polymeric substrates, these may be treated, for example, by corona discharge, in order to improve the adhesion of the film or coating to the substrate.

The block copolymer film or coating is preferably deposited on the substrate in solution in an appropriate solvent, usually a volatile organic solvent. In order to obtain goodquality films and coatings, wherein the lamellae are ordered and regular it is preferred that the film or coating is relatively slow drying. Preferably the film or coating has a drying time of at least 15 minutes, more preferably at least 30 minutes, and most preferably at least one hour. For convenience, the drying time of the film or coating should preferably be less than 24 hours. Suitable volatile solvents for the film-forming or coating composition include, for example xylene and toluene, Preferably the film-forming or coating composition comprises a solution comprising from 5 to 20, more preferably from 7 to 15% by weight of the block copolymer.

After the film or coating has been formed, it can if desired be provided with a surface structure, for example, by using a roller. In this way the film or coating can be provided with a patterned surface.

In accordance with the invention the film or coating is light reflective and a property of the reflected light can be changed by varying the interlayer separation of the film or coating. In certain embodiments it may be possible to vary the interlayer separation of the film or coating by shrinking the film or coating by heating. However, preferably the interlayer separation of the film or coating is varied by contacting the film or coating with a liquid or vapour which swells the film or coating, thereby changing its interlayer separation. Usually the liquid or vapour will be a solvent for the block copolymer or blend thereof, but by virtue of the cross-linking, the film or coating can swell but will not dissolve in the solvent. Preferred solvents for swelling the film or coating include those mentioned above as solvents for the film-forming or coating composition. Volatile organic solvents such as, for example, toluene, chloroform and xylene are preferred.

The light reflective, variable interlayer separation, cross-linked self-assembling block copolymer films and coatings of the invention find applications in a variety of industries and technologies. For example, in fibre optics the film can be coated onto the inside of a hollow tube to create a high bandwidth optical fibre. This optical fibre could be used as a low cost detection medium for solvents, for example, in waste outflows. In addition, the film or coating may find application as an "over temperature device" whereby a colour change would be observed if the temperature exceeded a certain value. Further, the film or coating can be applied as a decorative ink or coating for any suitable surface.

The film and/or coating composition of the invention may further be applied as a security adhesive that would show if a packet had been opened or tampered with. A colour change would be observed on opening the packet.

The films and coating compositions of the invention find particular application in the field of security inks for bank notes, tickets and identification documents.

In the application of the invention to currency and document protection, the film or coating can be deposited on the surface of the currency or document as an interference filter. The colour exhibited by the interference filter is a function of the viewing angle and its interlayer separation. In order to authenticate the currency or document it is merely necessary to contact the surface of the film with sufficient solvent to cause the film or coating to swell, whereupon the observed colour will change. In preferred embodiments of the invention colour changes from blue to green, yellow, and even red may be observed. The authentication can be extremely rapid, since merely wiping the surface of the film with a cotton bud dipped in an appropriate solvent can be sufficient to swell the film and change the observed colour.

In the application of the invention to detecting the amount or presence of a substance, a suitable device can also comprise, for example, a substrate having the film or coating deposited thereon. In the absence of the substance, usually a liquid, to be detected, a first colour of the film or coating is observed. When the film or coating is contacted by the substance it will swell and a second colour will be observed. The device could accordingly be suspended, for example, in a channel through which water is flowing, and could detect the presence of organic liquid contaminants in the flow.

Embodiments of the invention will now be described, by way of example only, in the following Example:

EXAMPLE

This Example describes the production of a cross-linked styrene-isoprene block copolymer (PS-PI) and its use as a multilayer light reflective variable interlayer separation film.
Synthesis of Block Copolymer Manipulations were carried out under high vacuum using standard anionic polymerisation techniques unless otherwise stated. Styrene was dried over calcium hydride then distilled onto solvent-free dibutyl magnesium. Isoprene was dried over calcium hydride and then over solvent-free n-butyllithium just prior to the distillation of a known volume into an ampoule fitted with a thin glass break-seal. Benzene was dried over polystyryllithium, an orange colour indicating that it was free of protic impurities. The initiator, sec-butyllithium, was distilled over a short-path using a cold-finger, diluted with dry cyclohexane and the molarity of the resulting solution determined by titrating a known volume against standard HCl using phenolphthalein as an indicator. Methanol was degassed and distilled.

A reactor was constructed having sealed ampoules of sec-butyllithium, methanol and isoprene. The reactor was equipped with a magnetic breaker/stirrer. A purge vessel of polystyryllithium in benzene was also attached to the reactor via a greaseless tap. The reactor was rinsed with the polystyryllithium solution then rinsed several times with benzene distilled from the purge vessel. Styrene and benzene were distilled into the reactor and the reactor sealed under vacuum. The styrene polymerisation commenced on the addition of the sec-butyllithium, the appearance of an orange colour being observed, and was allowed to proceed for 24 hrs, after which time the isoprene was added, the solution becoming colourless. After a further 24 hrs, the reaction was terminated on the addition on methanol. The polymer was precipitated in methanol to which 2,6-di-tert-butyl 4-methylphenol had been added, collected and dried.

The polymer was dried under high vacuum in a reactor at room temperature for 72 h prior to further use.
Protocol for Hydroboration/Hydroxylation Reagents were used as received unless stated otherwise. Benzene was dried over n-butyllithium using styrene as an indicator. THF was dried over sodium-benzophenone, a deep purple colour signifying the absence of water. Methanol was dried over 4 Å molecular sieves.

The reactor design allowed manipulations/distillations to be performed under high vacuum while permitting reagents to be injected, via septa, under dry nitrogen and to be thoroughly purged with nitrogen before being charged to the vessel, thus eliminating moisture from the reaction.

Figure 2:
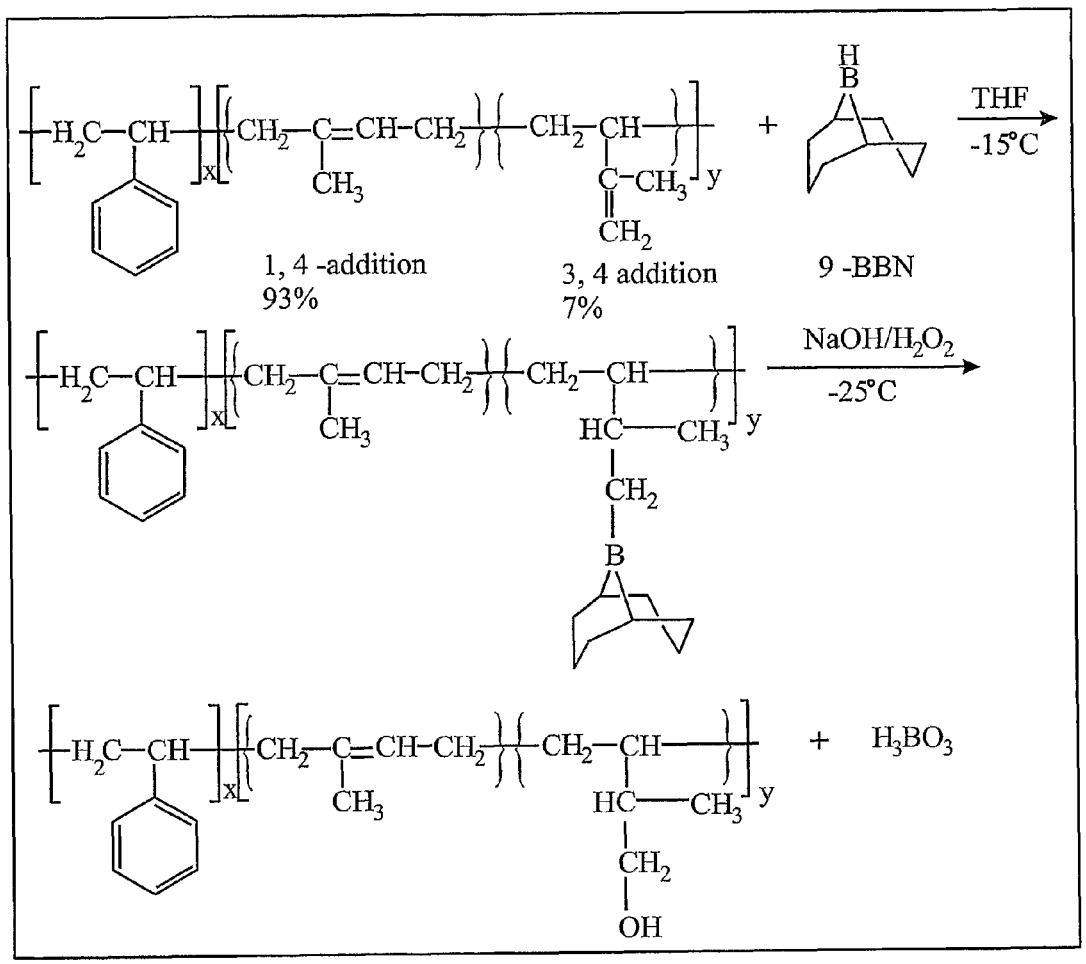
FIG. 2 shows a reaction scheme for hydroboration/oxidation reactions in the preparation of a polymer for use in the methods described herein.

The reaction scheme for hydroboration/oxidation is shown in FIG. 2.

The polymer was freeze-dried using benzene and then further dried under vacuum for 24 hours. Dry THF was distilled into the reactor and the polymer dissolved. The reactor was removed from the vacuum line and the polymer solution was cooled to −15° C. The inlet tube was purged with dry $N_2$ for 10 min and then 0.5 M 9-BBN (9-borabicyclo[3.3.1]

nonane) injected into the inlet tube, and degassed using dry nitrogen for 10 min. BBN was added and the reactor was then allowed to warm slowly to 5° C. The solution was stirred for 24 h at RT.

The reactor was cooled and anhydrous methanol distilled into the reactor to ensure no residual BBN remained in polymer solution. At this point, a white precipitate (boric acid) was observed. The reaction was left to stir for 90 minutes to allow unreacted BBN to react with the methanol. NaOH solution was degassed in an inlet tube using nitrogen for 30 min. Small particles were seen after the addition of the NaOH solution. $H_2O_2$ was slowly added after degassing for 30 min. Stoichiometric amounts of NaOH/$H_2O_2$ and the low temperature were needed to prevent side reaction between residual double bonds in partially modified polymer and the hydrogen peroxide. The cloudy solution was kept at −25° C. for 2 hours then allowed to warm to RT and stirred for a further hour before the temperature was increased again to 55° C. at which point large white particles were observed. The reaction was cooled and the lower (aqueous) layer frozen and then the organic layer decanted into 0.25M NaOH and the polymer was precipitated. The crude product was filtered and washed with dilute NaOH. The product was re-dissolved in THF and precipitated in 0.25M NaOH and stirred overnight then filtered. This process was repeated 3 times before finally washing with copious amounts of distilled water before finally drying.

For the following modification reactions hydroxylated polymer was purified using Mao's method[3]. Due to the small amount of hydroxyl groups introduced it was still possible to dissolve the polymer in THF and chloroform. THF was used as a solvent in the purification procedure. NMR, SEC and FTIR were employed to characterise the final product.

$^1$H NMR spectra show that the amount of 3,4-PI is only just discernible, and a new peak appears at 3.36 ppm, representing [—CH—CH$_2$—O—], indicating that the hydroxylation went nearly to completion for the 3,4 enchained units. Further assignment shows that the ratio of 1,4 peak to aromatic styrene proton peaks does not change, proving selectivity of hydroxylation.

Polydispersities (PD) calculated from the SEC traces (relative to polystyrene standards) for neat and hydroxylated block copolymer PD 1.40 and PD 1.48 respectively. The PD is nearly the same, showing that no side reactions occurred during the hydroxylation The number of mole of isoprene (calculated using NMR from neat block copolymer) multiplied by mole fraction of hydroxyl groups (calculated using NMR from hydroxylated block copolymer) gives the number of moles of hydroxyl groups per block copolymer chain. Data calculated for a selection of the block copolymers used are summarized in Table 1.

TABLE 1

Degree of hydroxylation (mole hydroxyl groups per block copolymer chain) for all block copolymers

| Block copolymer | Molecular weight | Wt % Isoprene block | Mol % Vinyl groups | Number of hydroxyl groups per Chain |
|---|---|---|---|---|
| SI500H | 500 000 | 48 | 7 | 244 |
| SI600I-H | 600 000 | 48 | 87 | 352 |
| SI850I-H | 850 000 | 57 | 20 | 741 |
| SI1M-H | 1 000 000 | 54 | 7 | 339 |
| SI1ML-H | 1 000 000 | 54 | 6.2 | 508 |

Cross-Linking of Hydroxylated Block Copolymer with MDI and Film Casting.

Varying ratios of MDI to copolymer were made up to give 55 mol %, 30 mol % and 10 mol % MDI to hydroxyl group. The block copolymer was dried under vacuum and dissolved in mixture of dry THF/o-xylene (ratio 1:2); MDI was dried under vacuum and dissolved in dry THF. MDI solution was added to the block copolymer solution and well mixed.

The film was deposited on a polypropylene substrate (Corona discharge treated PP, about 8 mol %. hydroxyl groups present on the surface—as determined using XPS). MDI reacts with the hydroxyl groups present in the block copolymer and on the PP substrate (urethane linkage), thus acting as a cross linker and primer. For dried films, the decrease in isocyanate group absorbance with time was followed by attenuated total reflectance FTIR (FTIR-ATR). The height of isocyanate peak was normalized, using the CH stretch peak as an internal standard[4]. After 24 h of film preparation only 30% of the initial isocyanate groups were still present.

The adhesion on PP film was assigned using a razor blade method (after 24 hours of preparation). For films prepared from SI600-55MDI and SI600-30MDI separation of the block copolymer film from the PP substrate was not possible. For SI600-10MDI it was much easier to peel off the coating from the substrate. Additionally SI600-55MDI, SI600-30MDI and SI600-10MDI were coated on 5 different substrates.

Variable Light Reflective Properties

The variable light reflective properties of the films were demonstrated by UV-VIS spectroscopy and by eye.

The variation in colour as the films were exposed to solvent was demonstrated by swiping a "cotton bud" that had previously been dipped into solvent across a cured film. The film showed colour changes dependent on the molecular weight of the polymer. Thus the 500,000 MW polymer film changed from uncoloured to violet, the 600,000 MW polymer film from blue to green, the 850,000 MW polymer film from blue to orange and the 1,000,000 MW polymer film from blue to red.

Various solvents were used including chloroform, toluene and xylene.

(1) Hadjichristidis, N.; Iatrou J.; Pispas, S.; Pitsikalis, M. In *J. Polym. Sci:Part A:Polymer Chem.*, 2000; Vol. 38, pp 3211-3234

(2) Chung, T. C.; Raate, M.; Berluche, E.; Schulz, D. N. In Macromolecules, 1988; vol. 21. pp 1903-1907.

(3) Mao. G,: Wang, J,: Clingman, S. R,: Ober, C. K.; Chen, J. T.; Thomas, E. L. In *Macromolecules*, 1997; Vol. 30, pp 2556-2567.

(4) Li, W., *Morphology development in flexible polyurethane foam*, in Chemistry. 2001, The University of Sheffield: Sheffield. P. 75.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of manufacturing a multilayer light reflective, variable interlayer separation, cross-linked self-assembling block polymer film or coating, which comprises depositing a film or coating of a composition comprising a self-assembling block copolymer or a self-assembling blend of block copolymers on a substrate, and cross-linking the deposited film or coating; wherein the film or coating comprises alternating layers of different refractive indices or lamellae.

2. The method according to claim 1, wherein the block copolymer film or coating is deposited on the substrate in solution in a volatile organic solvent.

3. The method according to claim 1, wherein the block copolymer or blend is selected from block copolymers of $C_{1-6}$ aliphatic monomers, dienes, $C_{8-12}$ aromatic monomers, block copolymers of polyolefins with vinyl polymers derived from $C_{1-6}$ aliphatic esters, alcohols, and amines, $C_{1-6}$ alkylene oxides, and $C_{7-12}$ heterocyclic monomers.

4. The method according to claim 1, wherein the block copolymer or blend is selected from block copolymers of styrene with methylmethacrylate P(S-b-MMA), isoprene P(S-b-I), butadiene P(S-b-BD), ethylene oxide P(S-b-PEO) and 2-vinylpyridine P(S-b-2-VP).

5. The method according to claim 1, wherein a refractive index modifier is added to one or more of the layers such that a difference between refractive indices of the lamellae is increased relative to a difference between refractive indices of the lamellae in the absence of the modifier.

6. The method according to claim 5, wherein the refractive index modifier comprises nanoparticles of a noble metal.

7. The method according to claim 1, wherein the composition also comprises a cross-linking agent.

8. The method according to claim 7, wherein the cross-linking agent is selected from isocyanates, carbodiimides, peroxides, polyols, primary diamines, primary polyamines, secondary diamines, secondary polyamines, aromatic diamines, methylpolyethyleneglycolamines, mercaptopropionic acid, mercaptopropionates and silanes.

9. The method of claim 1, further comprising treating the film or coating to vary the thickness of the alternating layers or lamellae thereof, thereby changing a property of light reflected from the film or coating.

* * * * *